US009476453B2

(12) United States Patent
Ishii et al.

(10) Patent No.: US 9,476,453 B2
(45) Date of Patent: Oct. 25, 2016

(54) CU-BASED OIL-IMPREGNATED SINTERED BEARING

(75) Inventors: Yoshinari Ishii, Niigata (JP); Yasuhiro Tsukada, Niigata (JP)

(73) Assignee: DIAMET CORPORATION, Niigata-Shi (JP)

( * ) Notice: Subject to any disclaimer, the term of this patent is extended or adjusted under 35 U.S.C. 154(b) by 310 days.

(21) Appl. No.: 13/882,595

(22) PCT Filed: Nov. 7, 2011

(86) PCT No.: PCT/JP2011/075622
§ 371 (c)(1),
(2), (4) Date: Apr. 30, 2013

(87) PCT Pub. No.: WO2012/063786
PCT Pub. Date: May 18, 2012

(65) Prior Publication Data
US 2013/0223774 A1  Aug. 29, 2013

(30) Foreign Application Priority Data

Nov. 8, 2010 (JP) ................................ 2010-250179

(51) Int. Cl.
*F16C 33/10* (2006.01)
*B22F 5/10* (2006.01)
(Continued)

(52) U.S. Cl.
CPC .............. *F16C 33/104* (2013.01); *B22F 3/11* (2013.01); *B22F 5/106* (2013.01); *C22C 1/1084* (2013.01); *C22C 9/02* (2013.01); *C22C 9/06* (2013.01); *F16C 33/128* (2013.01); *F16C 2204/10* (2013.01); *F16C 2326/01* (2013.01); *F16C 2326/09* (2013.01)

(58) Field of Classification Search
CPC  F16C 2204/10; F16C 33/104; F16C 33/128; F16C 33/121; B22F 5/106
USPC .......................................................... 384/279
See application file for complete search history.

(56) References Cited

U.S. PATENT DOCUMENTS 4,274,874 A    6/1981  Obara et al.
2004/0071374 A1    4/2004  Tomita et al.
(Continued)

FOREIGN PATENT DOCUMENTS

CN          1493420 A    5/2004
CN       101098977 A    1/2008
(Continued)

OTHER PUBLICATIONS

International Search Report mailed Jan. 31, 2012 for the corresponding PCT Application No. PCT/JP2011/075622.
(Continued)

*Primary Examiner* — Weiping Zhu
(74) *Attorney, Agent, or Firm* — Leason Ellis LLP

(57) ABSTRACT

There is provided a Cu-based oil-impregnated sintered bearing which can be used for high-load applications such as an ABS system and a wiper motor system in automobile, can be manufactured at low cost, and is excellent in abrasion resistance and seizure resistance. The bearing contains 5 to 40% by mass of Ni, 3 to 15% by mass of Sn, 0.5 to 4.0% by mass of P, or further 0.3 to 5.0% by mass of a solid lubricant, and a remainder comprising Cu and inevitable impurities, and has a metallic structure in which a phase mainly composed of Ni and P is dispersed in a matrix, and has a 5 to 25% porosity.

4 Claims, 4 Drawing Sheets

Electron micrograph (at 1,000 magnifications) taken for analysis of cross-sectional structure of Cu-9Ni-8Sn-1.2P (Ni-P added)

(51) Int. Cl.
*C22C 1/10* (2006.01)
*C22C 9/02* (2006.01)
*C22C 9/06* (2006.01)
*F16C 33/12* (2006.01)
*B22F 3/11* (2006.01)

(56) References Cited

U.S. PATENT DOCUMENTS

2009/0011268 A1* 1/2009 Shimizu et al. .............. 428/550
2009/0311129 A1 12/2009 Harakawa et al.

FOREIGN PATENT DOCUMENTS

| JP | 62-133027 A | | 6/1987 |
| JP | 62133027 A | * | 6/1987 |
| JP | 05-195117 A | | 8/1993 |
| JP | 11-158511 A | | 6/1999 |
| JP | 2004-143580 A | | 5/2004 |
| JP | 2006-199977 A | | 8/2006 |
| JP | 2008-019929 A | | 1/2008 |
| JP | 2009-285983 A | | 12/2009 |
| JP | 2011-80525 A | | 4/2011 |

OTHER PUBLICATIONS

Chinese Office Action mailed Jul. 3, 2014 for the corresponding Chinese Application No. 201180053762.2.
Office Action mailed Jun. 10, 2014 for the corresponding Japanese Application No. 2012-542914.
Office Action mailed Oct. 6, 2015 for the corresponding Japanese Application No. 2012-542914.
Extended European Search Report mailed Mar. 30, 2016 for the corresponding European Patent Application No. 11839871.8.
Office Action mailed Feb. 9, 2015 for the related Japanese Application No. 2012-542914.
Massalski et al., "Binary Alloy Phase Diagrams vol. 1", *American Society for Metals*, pp. 945, Metals Park, Ohio, U.S.A., 1986.

* cited by examiner

Electron micrograph (at 1,000 magnifications) taken for analysis of cross-sectional structure of Cu-7.7Ni-6.8Sn-1.2P-1C (Cu-P added)

Electron micrograph (at 1,000 magnifications) taken for analysis of cross-sectional structure of Cu-9Ni-8Sn-1.2P (Ni-P added)

Electron micrograph (at 1,000 magnifications) taken for analysis of cross-sectional structure of Cu-9Ni-8Sn-0.9P-1C Electron micrograph (at 1,000 magnifications) taken for analysis of cross-sectional structure of Cu-9Ni-8Sn-0P-1C

CU-BASED OIL-IMPREGNATED SINTERED BEARING

CROSS-REFERENCE TO RELATED PATENT APPLICATIONS

This application is a U.S. National Phase Application under 35 U.S.C. §371 of International Patent Application No. PCT/JP2011/075622, filed Nov. 7, 2011, and claims the benefit of Japanese Patent Application No. 2010-250179, filed Nov. 8, 2010, all of which are incorporated by reference herein. The International Application was published in Japanese on May 18, 2012 as International Publication No. WO/2012/063786 under PCT Article 21(2).

FIELD OF THE INVENTION

The present invention relates to a Cu-based oil-impregnated sintered bearing employed for high-load applications.

BACKGROUND OF THE INVENTION

Heretofore, ball bearings have been employed in an ABS system of automobile. This is because bearings of an automobile ABS system are subjected to a high load. If sintered bearings can be employed instead of expensive ball bearings, then the ABS system would be able to be made up at a lower cost. However, because the load applied to the bearings of an ABS system of automobile sometimes exceeds an allowable load range of a conventional sintered bearing, it has been difficult to employ the conventional sintered bearing.

Further, Fe—Cu-based sintered bearings have been employed for bearings of a wiper motor system of automobile. This is because the wiper motor system in automobile has become increasingly smaller and thus the bearings employed therein have been reduced in size, thus leading to the increase in load applied to the bearing of the wiper motor system. Whilst Fe—Cu-based bearings excel in strength and hardness as compared to Cu-based sintered bearings; they may cause abnormal abrasion and seizure due to the same-metal phenomenon when a Fe-based material is used for a shaft borne by the bearing, thus leading to the problem that the reliability thereof as a sliding member is insufficient.

On the other hand, Japanese unexamined patent application publication No. H05-195117 discloses a Cu-based sintered alloy that is employed as a sliding member such as a valve guide or the like used for internal combustion engine and has excellent abrasion and seizure resistances under high temperature, high load and poor lubrication conditions.
Problem to be solved by the invention The Cu-based sintered alloy disclosed in Japanese unexamined patent application publication No. H05-195117 is one where abrasion and seizure resistance are imparted thereto by adding Ni-based hard particles having favorable adhesion to a matrix and $MoS_2$ as a solid lubricant, to a Cu—Ni—Sn-based alloy having such a composition that allows hardening to be caused by spinodal decomposition. However, since the expensive Ni-based hard particles are used to produce the Cu-based sintered alloy, there has been such a cost problem that it is unable to be produced at low cost. Besides, since the Ni-based hard particles used for the Cu-based sintered alloy contain Cr, adhesion to the matrix is not necessarily sufficient in performing an atmospheric sintering inside a continuous furnace that excels in mass productivity when performing a sintering process. Therefore, there has been a production problem that there could not be stably obtained products excellent in both abrasion and seizure resistances.

SUMMARY OF THE INVENTION

Therefore, it is an object of the present invention to provide, by sweeping the above problems, a low-cost Cu-based oil-impregnated sintered bearing which is not only able to be used for high-load applications such as an ABS system and a wiper motor system of automobile but also excellent in abrasion and seizure resistances.

Means for Solving the Problem

The Cu-based oil-impregnated sintered bearing according to the present invention contains 5 to 40% by mass of Ni, 3 to 15% by mass of Sn, 0.5 to 4.0% by mass of P, optionally 0.3 to 5.0% by mass of a solid lubricant, and a remainder comprising Cu and inevitable impurities, has a metallic structure in which a phase mainly composed of Ni and P is dispersed in a matrix, and has a 5 to 25% porosity.

Further, the above solid lubricant is any one of graphite, graphite fluoride, molybdenum disulfide, boron nitride, calcium fluoride, and talc.

Effects of the Invention

The Cu-based oil-impregnated sintered bearing according to the present invention contains 5 to 40% by mass of Ni, 3 to 15% by mass of Sn, 0.5 to 2.0% by mass of P and a remainder comprising Cu and inevitable impurities, and has a metallic structure in which a phase mainly composed of Ni and P is dispersed in a matrix, and has a 5 to 25% porosity. Hence, the Cu-based oil-impregnated sintered bearing according to the present invention can be produced at a low cost and at the same time, excellent in abrasion resistance. Alternatively, the Cu-based oil-impregnated sintered bearing according to the present invention may further contain a 0.3 to 5.0% by mass of the solid lubricant so that it can be more excellent in abrasion resistance.

The above solid lubricant is any one of graphite, graphite fluoride, molybdenum disulfide, boron nitride, calcium fluoride, and talc. Hence, the Cu-based oil-impregnated sintered bearing according to the present invention is allowed to have lubricating property imparted thereto, thereby becoming excellent in abrasion resistance.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Figure 1:
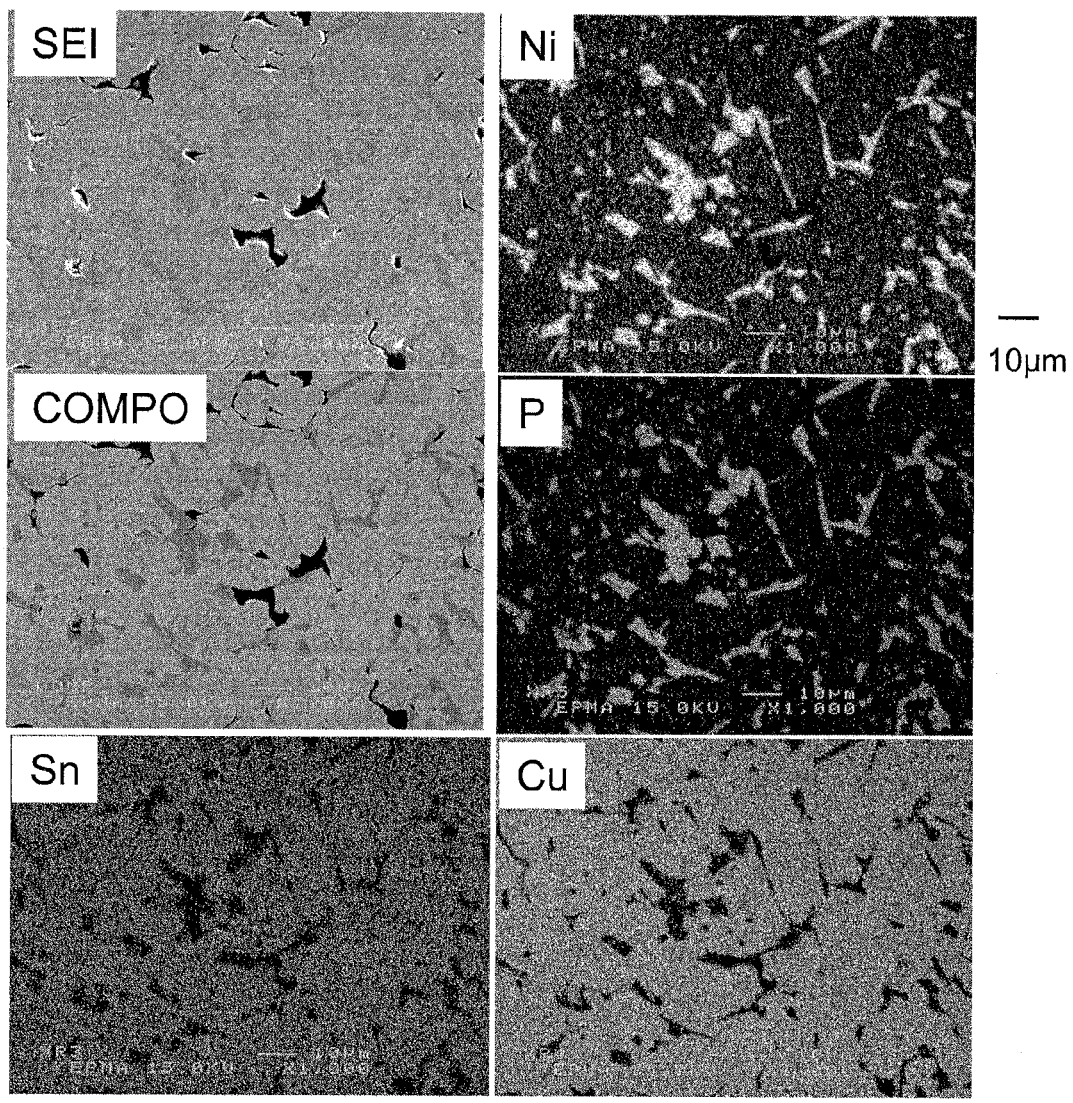
FIG. 1 is an electron micrograph of a bearing in which Cu—P powders are added to contain 7.7% by mass of Ni, 6.8% by mass of Sn, 1.2% by mass of P, 1.0% by mass of C, and a remainder comprising Cu.

A Cu-based oil-impregnated sintered bearing according to the present invention contains, in mass %, 5 to 40% of Ni, 3 to 15% of Sn, 0.5 to 4.0% of P and a remainder comprising Cu and inevitable impurities, and has a metallic structure in which a phase mainly composed of Ni and P is dispersed in a matrix, and has a 5 to 25% porosity. Hence, due to this composition, etc, the Cu-based oil-impregnated sintered bearing according to the present invention can be provided at a low-cost and with excellent abrasion resistance. Alternatively, the Cu-based oil-impregnated sintered bearing according to the present invention further contains 0.3 to 5.0% by mass of a solid lubricant to thereby become more excellent in abrasion resistance.

Hereunder is a detailed description of a composition of the Cu-based oil-impregnated sintered bearing according to the present invention. Note that all the contents described below are expressed as % by mass.

(1) Ni: 5 to 40% by Mass

Ni, together with P, forms an alloy phase, having functions to improve abrasion resistance and reduce a frictional coefficient. Besides, Ni, together with Cu, Sn and P, forms a solid solution of a matrix to improve the bearing strength, enabling the bearing strength to be further improved through age hardening, thereby making contributions to the improvement in the abrasion resistance of the bearing.

When an Ni content is less than 5%, no desired effect can be obtained. On the other hand, when the Ni content exceeds 40%, no desired improvement of effect can be obtained, even leading to an undesirable rise in cost of raw materials.

(2) Sn: 3 to 15% by Mass

Sn, together with Cu, Ni and P, forms a solid solution of a matrix to improve the bearing strength, enabling the bearing strength to be further improved through age hardening, thereby making contributions to the improvement in the abrasion resistance of the bearing. When an Sn content is less than 3%, no desired effect can be obtained. On the other hand, if the Sn content exceeds 15%, it is ineffective in improving the strength, even leading to an undesirable decrease in dimensional accuracy.

(3) P: 0.5 to 4.0% by Mass

P, together with Ni, forms an alloy phase, having functions to improve an abrasion resistance and to reduce a frictional coefficient. When a P content is less than 0.5%, however, no desired effect can be obtained. On the other hand, when the P content exceeds 4.0%, no desired effect is obtained either, even leading to an undesirable rise in cost of raw materials.

(4) Solid Lubricant: 0.3 to 5.0% by Mass, if it is to be Contained

Solid lubricants impart an excellent lubricating property to bearing, thus making contributions to improving the abrasion resistance of bearings. As the solid lubricant, the bearing according to the present invention may contain at least one of graphite, graphite fluoride, molybdenum disulfide, boron nitride, calcium fluoride, and talc ($Mg_3Si_4O_{10}(OH)_2$). Note that talc changes into enstatite after a sintering process.

The solid lubricant may be contained if needed. In the case that the solid lubricant is contained, if the content of the solid lubricant is less than 0.3%, no effect of the improvement in the abrasion resistance can be obtained. If the content exceeds 5%, then the bearing strength is remarkably reduced, leading to an undesirable result.

(5) With Respect to a Phase Mainly Composed of Ni and P

Either one or both of Ni—P alloy powders and Cu—P alloy powders is/are added to Cu—Ni—Sn alloy powders, and then mixed powders thus obtained are sintered at a temperature within a range of 720 to 900 degrees C., and hence, there can be obtained a Cu-based sintered oil-impregnated bearing having a metallic structure in which a phase mainly composed of Ni and P is dispersed in a matrix. This metallic structure has a greater hardness than the matrix, thus contributing to the abrasion resistance of the bearing.

Hereunder is a description of specific embodiments of the Cu-based oil-impregnated sintered bearing according to the present invention. Note that the present invention is not limited to the following embodiments and various modifications are possible.

Embodiments (1) Manufacturing of the Cu-Based Oil-Impregnated Sintered Bearing.

As raw powders, there were prepared Cu—Ni—Sn alloy powders (content ratios of Ni and Sn are shown in Table 1) of 100 mesh or less particle diameter, Cu-8% P powders of 200 mesh particle diameter, Ni-11% P powders of 350 mesh particle diameter, Sn powders of 200 mesh particle diameter, and solid lubricants such as graphite powders of 20 μm average particle diameter. These raw powders were compounded so as to have the elemental compositions shown in Table 2 and Table 3, and then 0.5% by mass of zinc stearate was added thereto and mixed together by a V-type mixer for 20 minutes, followed by subjecting the composites to pressure molding at a given pressure within 200 to 700 MPa, and thus, ring-shaped green compacts were produced. Then, the green compacts thus produced were sintered at a predetermined temperature within 720 to 900 degrees C. in an atmosphere of an endothermic gas obtained by mixing a natural gas and air and then decomposing and modifying the mixtures by passing the same through a heated catalyst, then followed by subjecting the same to a sizing step, and thus there were obtained the Cu-based sintered alloys. Here, some of the Cu-based sintered alloys thus obtained were subsequently subjected to an aging treatment under conditions of at 350 degrees C. for 1 hr. Then, a lubricating oil was impregnated into the Cu-based sintered alloys. Through the above-described process, there were prepared Cu-based oil-impregnated sintered bearings, all of which having a ring shape of a 18 mm outer diameter, 8 mm inner diameter and 4 mm height, and compositions shown in Tables 2 and 3.

After analyzing the Cu-based oil-impregnated sintered bearings thus prepared, using an electron probe microanalizer (EPMA), they were found to have a metallic structure in which a phase mainly composed of Ni and P was dispersed in a matrix. Besides, it was found that these Cu-based oil-impregnated sintered bearings included porosities dispersed in the matrix at the rate of 5 to 25%.

In Tables 1 to 3, the Cu-based oil-impregnated sintered bearings within the scope of the present invention were denoted as "Examples of the present invention", while the Cu-based oil-impregnated sintered bearings outside the scope of the present invention were denoted as "Comparative examples".

TABLE 1

| Bearings | | Cu—Ni—Sn Powder | Sn Powder | Graphite powder | Cu—P Powder | Ni—P Powder | MoS$_2$ Powder | CaF$_2$ Powder | BN Powder |
|---|---|---|---|---|---|---|---|---|---|
| Examples of the Present Invention | 1 | Cu—8% Ni—7% Sn: 85 | — | — | 15 | — | — | — | — |
| | 2 | Cu—9% Ni—8% Sn: 90 | — | — | 10 | — | — | — | — |
| | 3 | Cu—9% Ni—8% Sn: 88.75 | — | — | 11.25 | — | — | — | — |
| | 4 | Cu—9% Ni—8% Sn: 88.75 | — | — | 11.25 | — | — | — | — |
| | 5 | Cu—9% Ni—8% Sn: 89.1 | — | — | — | 10.9 | — | — | — |
| | 6 | Cu—9% Ni—8% Sn: 82.05 | 5 | — | 7.5 | 5.45 | — | — | — |
| | 7 | Cu—9% Ni—8% Sn: 86.4 | — | — | — | 13.6 | — | — | — |
| | 8 | Cu—9% Ni—8% Sn: 73.15 | 7 | — | 6.25 | 13.6 | — | — | — |
| | 9 | Cu—9% Ni—8% Sn: 81.8 | — | — | — | 18.2 | — | — | — |
| | 10 | Cu—9% Ni—8% Sn: 71 | — | — | 6.25 | 22.7 | — | — | — |
| | 11 | Cu—9% Ni—8% Sn: 80.15 | — | — | 6.25 | 13.6 | — | — | — |
| | 12 | Cu—9% Ni—8% Sn: 72.73 | — | — | — | 27.27 | — | — | — |
| | 13 | Cu—9% Ni—8% Sn: 59.93 | 2 | — | 6.25 | 31.82 | — | — | — |
| | 14 | Cu—8% Ni—7% Sn: 84 | — | — | 15 | — | 1 | — | — |
| | 15 | Cu—9% Ni—8% Sn: 88.15 | — | 0.6 | 11.25 | — | — | — | — |
| | 16 | Cu—9% Ni—8% Sn: 87.75 | — | — | 11.25 | — | — | 1 | — |
| | 17 | Cu—9% Ni—8% Sn: 87.75 | — | — | 11.25 | — | — | — | 1 |
| | 18 | Cu—9% Ni—8% Sn: 86.05 | — | 1 | 7.5 | 5.45 | — | — | — |
| | 19 | Cu—9% Ni—8% Sn: 79.95 | 5.6 | 1.5 | 7.5 | 5.45 | — | — | — |
| | 20 | Cu—9% Ni—8% Sn: 88.09 | — | 1 | — | 10.91 | — | — | — |
| | 21 | Cu—9% Ni—8% Sn: 84.4 | — | 2 | — | 13.6 | — | — | — |
| | 22 | Cu—9% Ni—8% Sn: 79.82 | — | 2 | — | 18.18 | — | — | — |
| | 23 | Cu—9% Ni—8% Sn: 65.02 | 3 | 3 | 6.25 | 22.73 | — | — | — |
| | 24 | Cu—9% Ni—8% Sn: 57.93 | — | 4 | 6.25 | 31.82 | — | — | — |
| Comparative Examples | 1 | Cu—9% Ni—8% Sn: 96.25 | — | — | 3.75 | — | — | — | — |
| | 2 | Cu—9% Ni—8% Sn: 42.02 | 4 | — | 31.25 | 22.73 | — | — | — |
| | 3 | Cu—2% Ni—8% Sn: 92.5 | — | — | 7.5 | — | — | — | — |
| | 4 | Cu—9% Ni—2% Sn: 92.5 | — | — | 7.5 | — | — | — | — |
| | 5 | Cu—9% Ni—8% Sn: 82 | 10.5 | — | 7.5 | — | — | — | — |
| | 6 | Cu—9% Ni—8% Sn: 82.55 | 4 | 8 | — | 5.45 | — | — | — |
| | 7 | Cu—9% Ni—8% Sn: 84.5 | — | — | 7.5 | — | 8 | — | — |
| | 8 | Cu—9% Ni—8% Sn: 86.55 | — | — | — | 5.45 | — | — | 8 |

TABLE 2

| Sorting | No. | Element Composition (% by mass) | | | | Application of Aging Treatment | Radial Crushing Strength of Ring-shaped Bearing (N/mm$^2$) | Maximum Abrasion Depth (mm) | Maximum Abrasion Depth of Shaft (mm) |
|---|---|---|---|---|---|---|---|---|---|
| | | Ni | Sn | P | Cu | | | | |
| Examples of the Present Invention | 1 | 6.8 | 6.0 | 1.2 | Remainder | NO | 315 | 0.004 | <0.001 |
| | 2 | 8.1 | 7.2 | 0.7 | Remainder | NO | 344 | 0.007 | <0.001 |
| | 3 | 8.0 | 7.1 | 0.9 | Remainder | YES | 401 | 0.003 | 0.002 |
| | 4 | 8.0 | 7.1 | 0.9 | Remainder | NO | 368 | 0.004 | <0.001 |
| | 5 | 17.7 | 7.1 | 1.2 | Remainder | NO | 385 | 0.002 | <0.001 |
| | 6 | 12.2 | 11.6 | 1.2 | Remainder | NO | 377 | 0.005 | 0.002 |
| | 7 | 19.9 | 6.9 | 1.5 | Remainder | NO | 397 | 0.003 | 0.001 |
| | 8 | 18.7 | 12.9 | 2 | Remainder | NO | 381 | 0.003 | 0.001 |
| | 9 | 23.6 | 6.5 | 2 | Remainder | NO | 412 | 0.005 | <0.001 |
| | 10 | 26.6 | 5.7 | 3 | Remainder | NO | 398 | 0.003 | 0.002 |
| | 11 | 18.9 | 6.4 | 2 | Remainder | NO | 425 | 0.006 | 0.003 |
| | 12 | 30.8 | 5.8 | 3 | Remainder | NO | 439 | 0.006 | 0.001 |
| | 13 | 33.7 | 6.8 | 4 | Remainder | NO | 453 | 0.007 | 0.002 |
| Comparative Examples | 1 | 8.7 | 7.7 | 0.3* | Remainder | NO | 285 | 0.045 | <0.001 |
| | 2 | 24.0 | 7.4 | 5* | Remainder | NO | 482 | 0.010 | 0.007 |
| | 3 | 1.7* | 12.9 | 0.6 | Remainder | NO | 258 | 0.152 | <0.001 |
| | 4 | 8.3 | 1.9* | 0.6 | Remainder | NO | 356 | 0.037 | 0.002 |
| | 5 | 7.4 | 17* | 0.6 | Remainder | NO | 331 | 0.020 | 0.048 |

Note:
Mark "*" denotes the outside of the scope of the present invention.

TABLE 3

| Sorting | No. | Element Composition (% by mass) | | | | | | | | Application of Aging Treatment | Radial Crushing Strength of Ring-shaped Bearing (N/mm²) | Maximum Abrasion Depth (mm) | Maximum Abrasion Depth of Shaft (mm) |
|---|---|---|---|---|---|---|---|---|---|---|---|---|---|
| | | Ni | Sn | P | C | MOS₂ | CaF₂ | BN | Cu | | | | |
| Examples of the Present Invention | 14 | 6.7 | 5.9 | 1.2 | 0 | 1 | 0 | 0 | Remainder | NO | 278 | 0.003 | <0.001 |
| | 15 | 7.9 | 7.1 | 0.9 | 0.6 | 0 | 0 | 0 | Remainder | NO | 302 | 0.004 | 0.002 |
| | 16 | 7.9 | 7.0 | 0.9 | 0 | 0 | 1 | 0 | Remainder | YES | 387 | 0.005 | 0.001 |
| | 17 | 7.9 | 7.0 | 0.9 | 0 | 0 | 0 | 1 | Remainder | NO | 340 | 0.004 | <0.001 |
| | 18 | 12.6 | 6.9 | 1.2 | 1 | 0 | 0 | 0 | Remainder | NO | 368 | 0.003 | 0.002 |
| | 19 | 12 | 12.0 | 1.2 | 1.5 | 0 | 0 | 0 | Remainder | NO | 310 | 0.001 | <0.001 |
| | 20 | 17.6 | 7.0 | 1.2 | 1 | 0 | 0 | 0 | Remainder | NO | 390 | 0.002 | 0.001 |
| | 21 | 19.7 | 6.8 | 1.5 | 2 | 0 | 0 | 0 | Remainder | NO | 245 | 0.002 | 0.001 |
| | 22 | 23.4 | 6.4 | 2 | 2 | 0 | 0 | 0 | Remainder | NO | 253 | 0.003 | <0.001 |
| | 23 | 26.1 | 8.2 | 3 | 3 | 0 | 0 | 0 | Remainder | NO | 237 | 0.002 | <0.001 |
| | 24 | 33.5 | 4.6 | 4 | 4 | 0 | 0 | 0 | Remainder | NO | 223 | 0.004 | <0.001 |
| Comparative Examples | 6 | 12.5 | 10.8 | 0.6 | 8* | 0 | 0 | 0 | Remainder | NO | 61 | 0.071 | <0.001 |
| | 7 | 7.6 | 6.8 | 0.6 | 0 | 8* | 0 | 0 | Remainder | NO | 79 | 0.065 | <0.001 |
| | 8 | 12.6 | 6.9 | 0.3 | 0 | 0 | 0 | 8* | Remainder | NO | 68 | 0.079 | <0.001 |

Note:
Mark "*" denotes the outside of the scope of the present invention.

(2) Abrasion Resistance Test

An abrasion resistance test was performed on the Cu-based oil-impregnated sintered bearings thus obtained (hereunder, referred to as ring-shaped bearings). S45C pipe shaft was inserted into each of the ring-shaped bearings. Then, with a 1.5 MPa load, as a surface pressure, being applied toward a radial direction of each ring-shaped bearing (i.e., a direction perpendicular to the axial direction of the shaft), each shaft was rotated at a running speed of 100 m/min for 1,000 hrs. Afterward, the maximum abrasion depths on sliding surfaces of the ring-shaped bearings and S45C pipe shafts were measured to evaluate the abrasion resistance.

The results are shown in Table 2 and Table 3.

In the examples of the present invention, the maximum abrasion depth of the ring-shaped bearing was 0.009 mm or less and that of the shaft was 0.003 mm or less, thus proving that their abrasion resistances were extremely high. Besides, there could be observed such tendencies that the bearings to which the solid lubricant was added have higher abrasion resistance than ones to which no solid lubricant was added, and that the bearings that were subjected to aging treatment have higher abrasion resistance than ones that were not.

On the contrary, the maximum abrasion depth of the ring-shaped bearings in the comparative examples was 0.010 to 0.152 mm, showing that the bearings in the comparative examples exhibited significantly lower abrasion resistance than did the examples of the present invention, regardless of whether the solid lubricant was added thereto or not.

(3) Analysis Using an Electron Probe Microanalyzer

Figure 2:
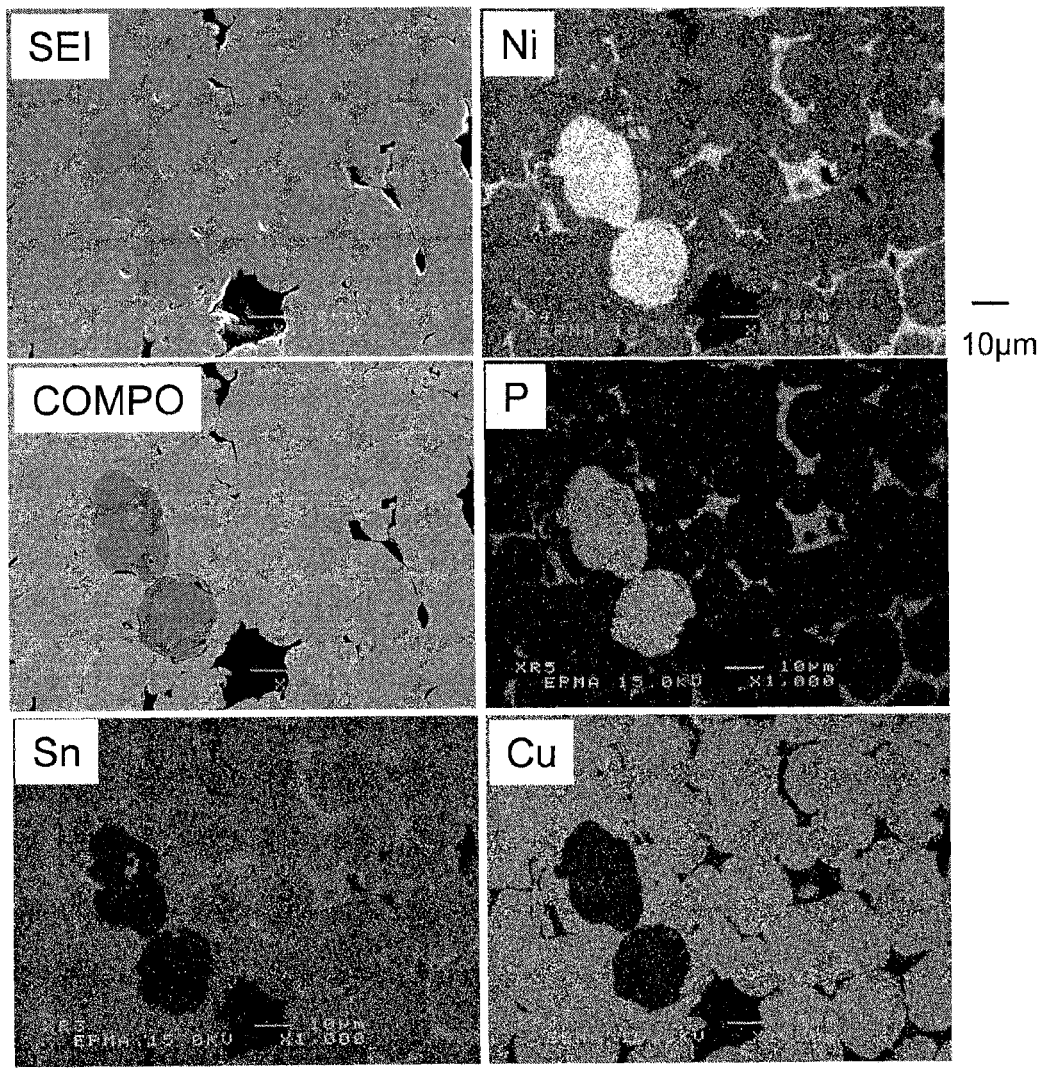
FIG. 2 is an electron micrograph of an example 20 of the present invention in which Ni—P powders are added.
Figure 3:
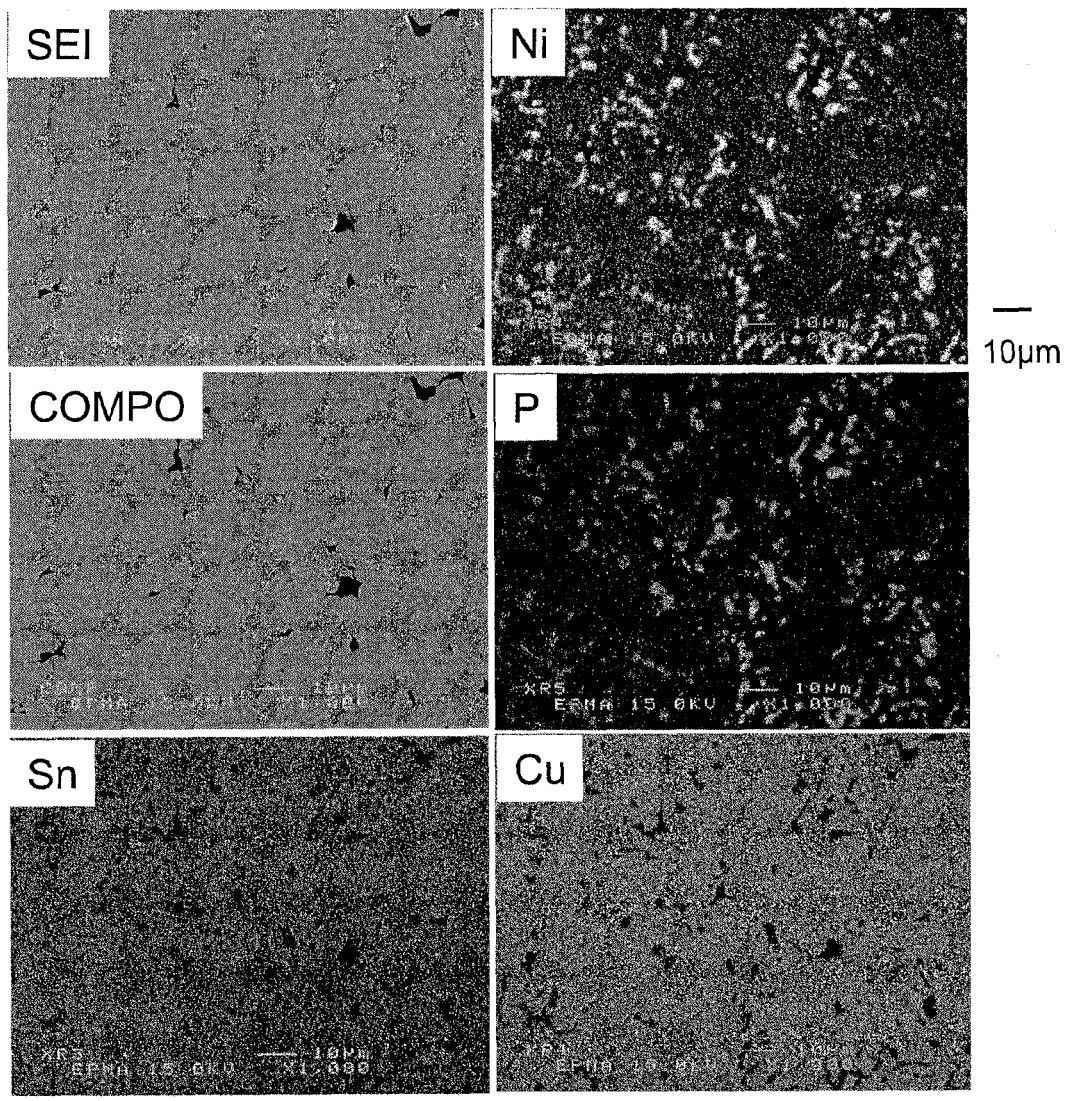
FIG. 3 is an electron micrograph of an example 4 of the present invention in which Cu—P powders are added.
Figure 4:
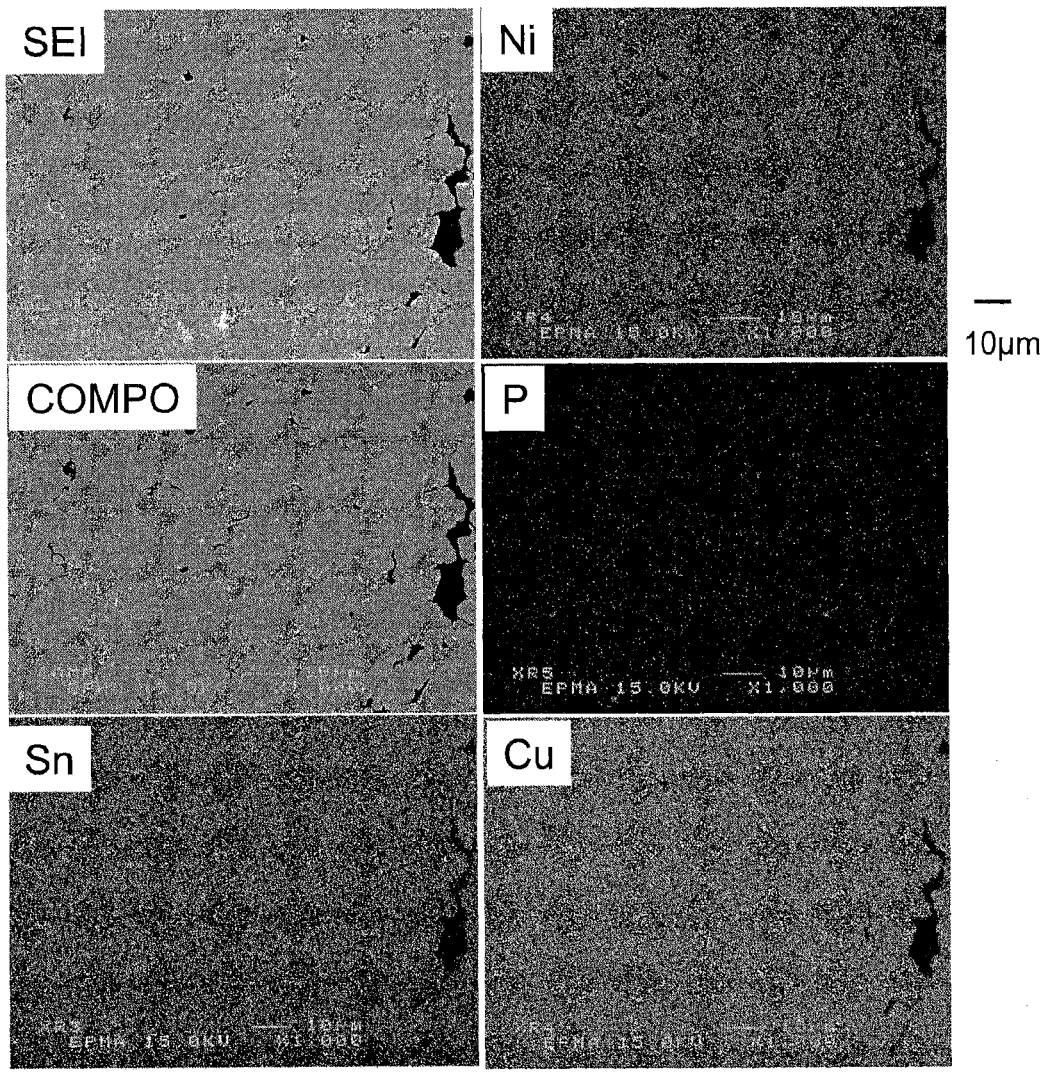
FIG. 4 is an electron micrograph of a bearing prepared to contain 9% by mass of Ni, 8% by mass of Sn, 0% by mass of P, 1.0% by mass of C, and a remainder comprising Cu.

Then, it was analyzed how Sn, Ni, P and Cu were distributed in a cross-sectional surface of the ring-shaped bearings thus produced according to the present invention, using an Electron Probe MicroAnalyzer (EPMA). As the analyzing condition, an accelerating voltage was set at 15 kV. The result is shown in FIG. 1 to FIG. 3. FIG. 1 shows a cross-sectional structure in the case that Cu—Ni—Sn powders, Cu—P powders and graphite powders were employed as raw materials, FIG. 2 shows that of the example 20 of the present invention in the case that Ni—P powders were employed as raw materials, and FIG. 3 shows that of the example 4 of the present invention in the case that Cu—P powders were employed as raw materials. And FIG. 4 shows a cross-sectional structure in the case that Cu—P powders were employed as raw materials in which only P content was decreased as compared to that in FIG. 3. In these figures, "SEI" denotes a secondary electron image, "COMP" denotes a reflection electron composition image. In both of the cases that Cu—P powders were employed as raw materials and Ni—P powders were employed as raw materials, it was verified that there did exist a metallic structure in which a phase mainly composed of Ni and P was dispersed in a matrix. In addition, as shown in FIG. 4, when the content of P was reduced to 0%, the above metallic structure was not found.

The invention claimed is:

1. A Cu-based oil-impregnated sintered bearing consisting of:
   5 to 40% by mass of Ni;
   3 to 15% by mass of Sn;
   0.9 to 4.0% by mass of P;
   0 to 1.0% by mass of a solid lubricant; and
   a remainder consisting of Cu and inevitable impurities,
   wherein
   said sintered bearing has a metallic structure in which a phase consisting essentially of Ni and P is dispersed in a matrix, and
   said sintered bearing has a 5 to 25% porosity.

2. The Cu-based oil-impregnated sintered bearing according to claim 1, wherein said solid lubricant is any one selected from the group consisting of graphite, graphite fluoride, molybdenum disulfide, boron nitride, calcium fluoride, and talc.

3. The Cu-based oil-impregnated sintered bearing according to claim 1, wherein the amount of the solid lubricant is 0% by mass.

4. The Cu-based oil-impregnated sintered bearing according to claim 1, wherein the sintered bearing is obtained after being subjected to an aging treatment under conditions of at least 350° C. for one hour.

* * * * *